United States Patent [19]

Orr

[11] Patent Number: 4,842,569
[45] Date of Patent: Jun. 27, 1989

[54] BICYCLE TRANSMISSION HAVING INFINITELY VARIABLE DRIVE RATIO

[75] Inventor: James E. Orr, San Antonio, Tex.

[73] Assignee: Recreational Accessoried Corporation, San Antonio, Tex.

[21] Appl. No.: 121,398

[22] Filed: Nov. 16, 1987

[51] Int. Cl.$^4$ ............................................. F16H 9/08
[52] U.S. Cl. ...................................... 474/83; 474/140
[58] Field of Search ................ 474/83, 140, 144, 145, 474/148; 280/236

[56] References Cited

U.S. PATENT DOCUMENTS

| | | | |
|---|---|---|---|
| 390,216 | 10/1888 | Evans | 74/192 |
| 1,637,664 | 7/1927 | Stoeckicht | 74/192 |
| 2,432,442 | 12/1947 | Pourtier | 74/192 |
| 2,801,547 | 8/1957 | Guibert | 474/83 |
| 2,807,171 | 9/1957 | Wyckoff | 74/192 |
| 3,043,149 | 7/1962 | Davin et al. | 74/192 |
| 3,394,602 | 7/1968 | Coghill | 474/83 |
| 3,906,809 | 9/1975 | Erickson | 474/83 |
| 3,934,492 | 1/1976 | Timbs | 474/83 X |

Primary Examiner—Jerome W. Massie, IV
Assistant Examiner—Matthew Smith

[57] ABSTRACT

A torque transmission apparatus having an infinitely variable gear ratio particularly suited for use as a bicycle transmission. The apparatus may be mounted on conventional bicycles and replaces the usual derailleur mechanism. A novel means is used to effect the gear changes which requires less force than previous devices. All force transmitting components of the apparatus are mechanically engaged without relying on friction which eliminates any possibility of slippage within the transmission.

11 Claims, 3 Drawing Sheets

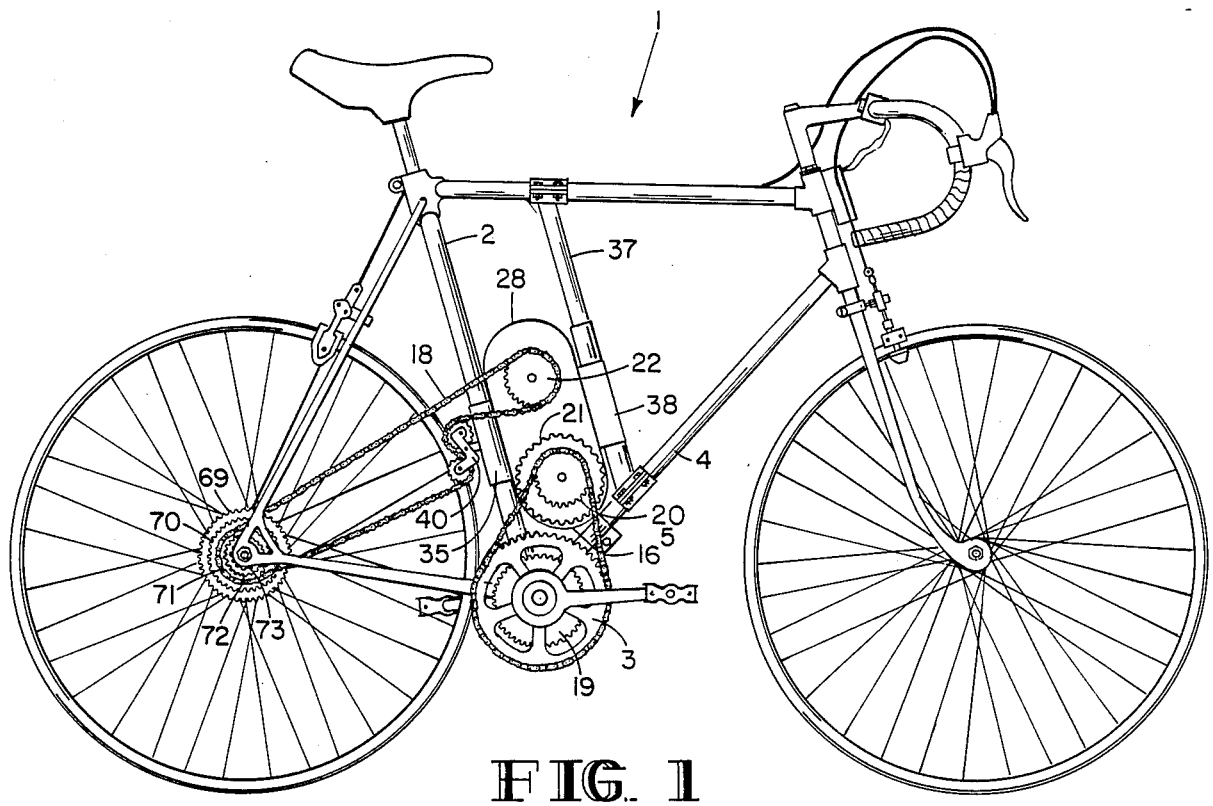
FIG. 1
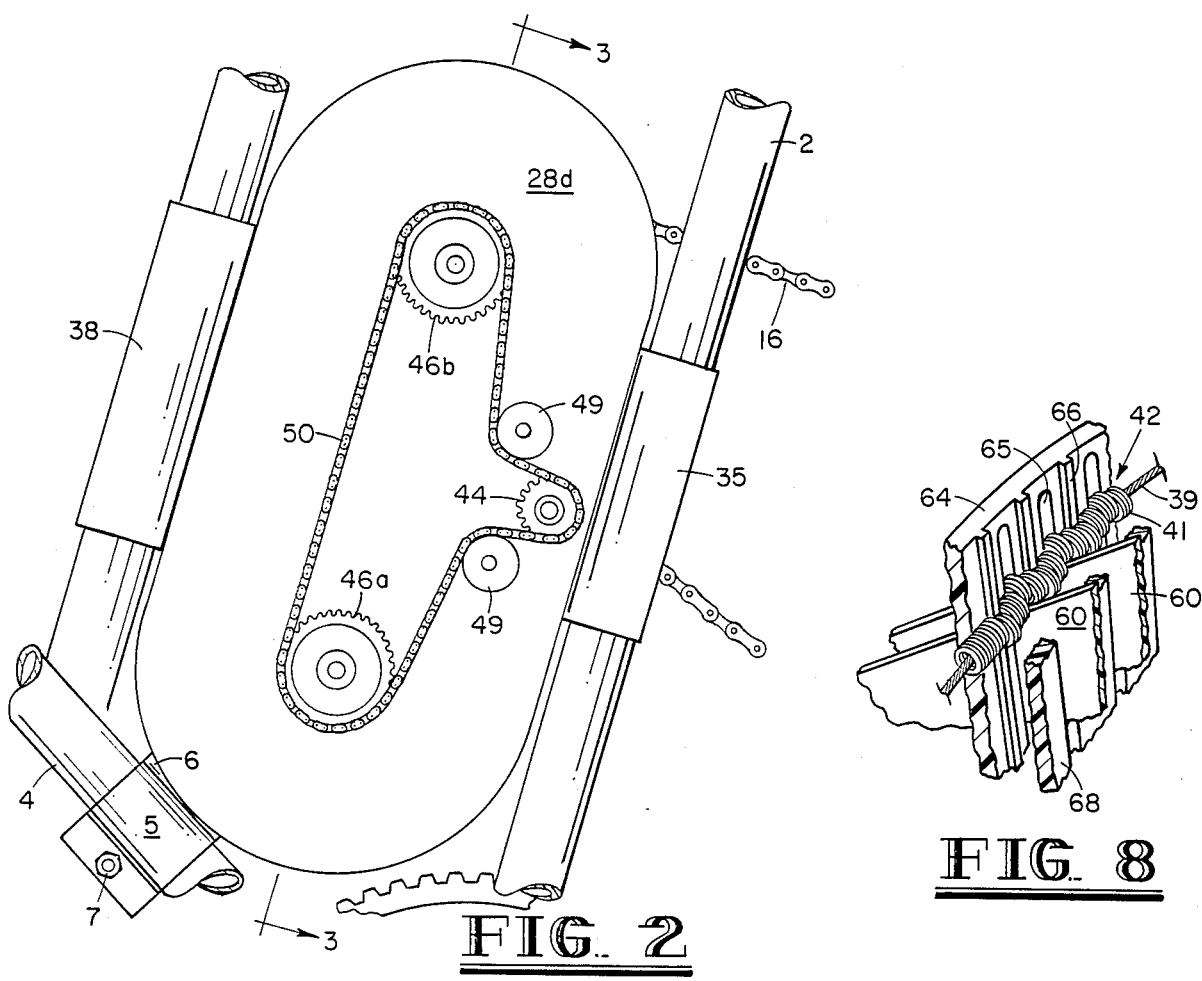
FIG. 2
FIG. 8

BICYCLE TRANSMISSION HAVING INFINITELY VARIABLE DRIVE RATIO

BACKGROUND OF THE INVENTION

The present invention relates to a transmission apparatus having an infinitely variable drive ratio. It has been designed specifically as an improved type of bicycle transmission but may be adapted to more general applications as well.

The derailleur gear changing mechanism, developed long ago, has, with minimal basic change, become the internationally accepted standard for high performance bicycles. Derailleur is a french word meaning literally to "derail", or in this case, to push a bicycle chain from one sprocket wheel to the next larger or smaller sprocket wheel. By doing so, the derailleur enables a bicycler to change gear ratios while riding. The mechanism consists of brackets, springs, tension idlers, alignment arms, and chain lifters connected by cable to shifting levers mounted on the frame. Because of an imperfect chain-line between the front and rear derailleurs, some "gears" or sprocket combinations that theoretically should work well together frequently do not. Derailleur shifting levers are confusing to the average rider and call for him to give up partial control of the handlebars while trying to pedal and search for a desired sprocket combination or "gear". This is a dangerous procedure for the novice rider, and has led to countless injuries.

The nature of a system employing the derailleur mechanism inherently limits the variety and range of working gear ratios of a given bicycle. Derailleurs are typically employed on "ten-speed" bicycles, in combination with two sprocket wheels attached to the pedal crank of the bicycle and a cluster of five smaller sprocket wheels threaded onto the rear axle hub. Ten combinations, having graduated gear ratios, are thus enabled. The relationship between the number of cogs on these sprockets when linked together by a chain determines the difference between the rotational velocities of the pedal crank and rear wheel. A standard 14, 16, 18, 21, and 24 cog combination sprocket wheel mounted on the rear axle, with 42 and 52 cog sprockets on the crank wheel, allows the derailleur to produce ten graduated gear ratios. The increase in power advantage over the entire range of gear combinations (from 14 and 52 cogs to 24 and 42 cogs), however, is only about two to one (100.3 to 47.3 inches in bicycle gear terms). Such a narrow range is mechanically necessitated by the spacial limitations on a bicycle chassis, which limitations are compounded by the physical versatility limitations of typically fit bicycle riders.

Further, spacial and human versatility those limitations constrain a rider's options to a given set of gear combinations for any particular bicycle, each combination corresponding to a different pedal cadence when traveling on a set slope. Since a constant, rythmic cadence is most efficient, riding efficiency is therefore diminished, especially when traveling over a common terrain that has frequently varying slope. Bicycles thus tend to be geared for particular purposes (e.g. touring, racing, cross country, etc.) and many applications require tailor-made gearing. As refined as derailleur systems are today, they are still limited by mechanical compromises and leave much to be desired.

There is, therefore, a need for a bicycle transmission device which enables the rider to smoothly shift from one gear to another over a wide range of gear ratios with a minimum of effort and attention.

It is further desirable for a transmission device to infinitely vary the gear ratio between the pedal crank and the rear wheel. Individuals vary greatly in their riding ability, and a set of gear ratios suitable for one rider may not be suitable for another rider. Also, as aforementioned, bicycles used for special purposes presently require customized gearing in order to obtain the desired set of gear ratios.

The present invention makes use of what may be referred to as a "conical spool" type of transmission to achieve infinitely variable gear ratios. Many prior devices, such as disclosed in U.S. Pat. Nos. 3,906,809 and 1,048,220 have also utilized oppositely oriented cone pulleys which are mechanically coupled together by means such as a belt. In order to change the gear ratio existing between the cone pulleys, the position of the coupling means must be moved along the length of the pulleys. Prior devices have, therefore, almost uniformly resorted to friction belts to couple the rotation of the cone pulleys together. Relying on friction, however, inherently results in mechanical inefficiencies and necessarily increases the chance of slippage as the cone pulleys are called upon to transmit greater amounts of torque.

A better solution replaces the friction belt with a chain which can mechanically engage cogs or similar structures mounted on each cone pulley. Such mechanical engagement, also referred to as "positive gripping" enables optimum performance as it eliminates the inefficiencies that are inherent with friction coupling belts. The difficulty with positive gripping when applied to a cone pulley system, however, is related to pitch. Since cogs on a cone pulley must necessarily be continuous structures in order for the chain to traverse the cone, the pitch (or spacing between the cogs of a cone pulley must change from one end of the cone pulley to the other). Previously known chains, on the other hand, cannot correspondingly vary their pitch. Chains have, therefore, been difficult to employ in conjunction with a cone pulley system. It is an object of the present invention to provide a means for coupling the rotation of two cones with a chain which mechanically engages each cone even as the chain is moved from one end of the cone to the other.

Although various means have been utilized in the prior art to vary the gear ratio, such as sliding the coupling belt or moving the cone pulleys themselves, none have been satisfactory for the special requirements of a bicycle transmission. It is an object of the present invention, therefore, to provide a bicycle transmission having an infinitely variable gear ratio wherein changes in the gear ratio are effected by utilizing a positive mechanical coupling between conical surfaces, thereby enabling a bicycle that exceeds the performance capabilities of the "ten speed".

SUMMARY OF THE INVENTION

The present invention makes use of oppositely oriented conical spools to achieve continuously variable gear ratios. The conical spools of the present invention, however, are distinguished from cone pulleys of the past. Each conical spool is formed in part by a plurality of planar segments whose outer edges collectively approximate a conical surface. The conical spools are mechanically coupled together by a uniquely modified cable, referred to as a "slot ring cable chain", for descriptive purposes, which mechanically engages the edges of the planar segments even as the pitch between the planar segments varies. The slot ring cable chain is constrained at certain points along each conical spool by means of a pair of circular plates, or sheaves. Such sheaves, thus, describe a circumferential track for the cable chain around each conical spool. Each sheave has a plurality of radially oriented slots through which pass the cone's planar segments as the sheaves traverse the spool.

A novel means of effecting the traversal of the sheaves along each spool in order to change the gear ratio of the transmission is also utilized. Mounted within each pair of sheaves is an impeller disk through which is threaded an impeller shaft. Rotation of the impeller shaft causes translation of the impeller disk along the impeller shaft. As the impeller shafts of each cone are mechanically coupled, simultaneous translation of each pair of sheaves is, thus, enabled through the respective conical spool along its axis.

Other objects, features and advantages of the invention will become evident in light of the following detailed description considered in conjunction with the referenced drawing of a preferred embodiment according to the present invention.

BRIEF DESCRIPTION OF THE DRAWINGS

FIG. 1 is a view of the preferred embodiment as it would be mounted on a standard bicycle.

FIG. 2 shows the preferred embodiment from the side opposite that shown in FIG. 1.

FIG. 8 is a close-up view of slot ring cable chain 42 engaging cams 60, slots 65, and runners 66.

DETAILED DESCRIPTION OF THE PREFERRED EMBODIMENT

Figure 3:
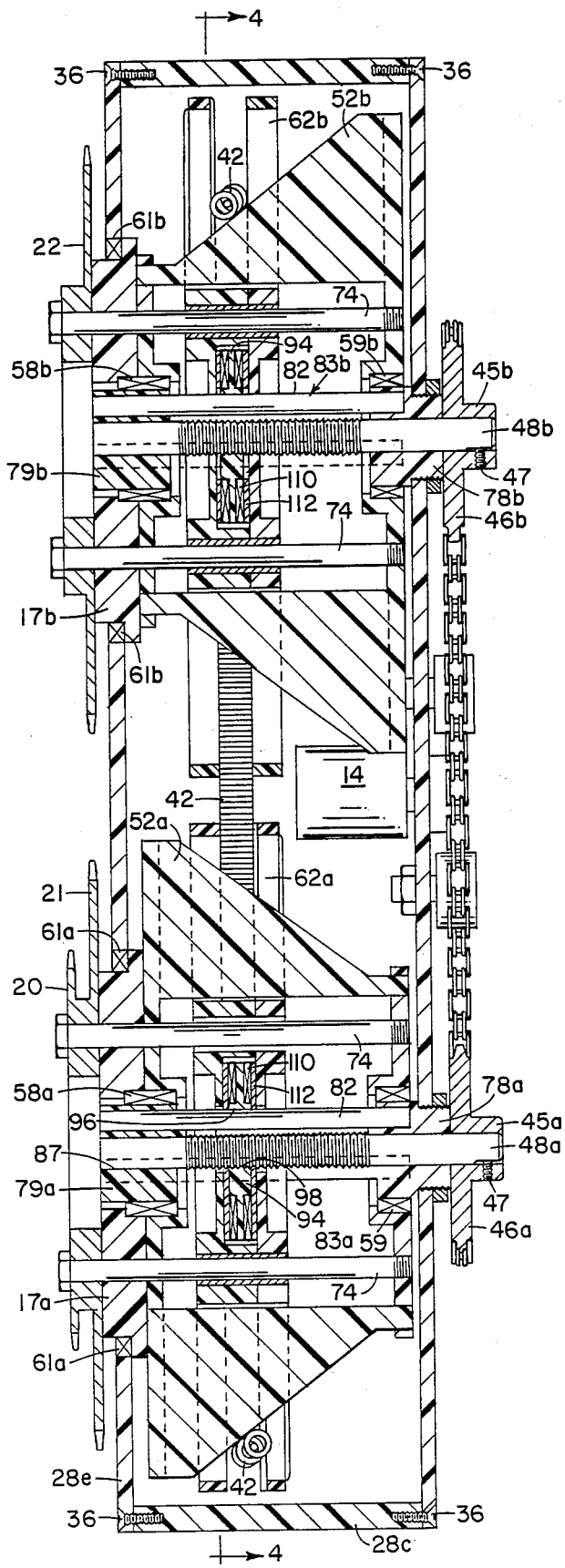
FIG. 3 is a cross-sectional view of the preferred embodiment in a plane 3—3 indicated in FIG. 2, which plane 3—3 is perpendicular to the planes of FIG. 1 and FIG. 2.

As will be evident in the description that follows, the preferred embodiment has a number of paired components. Unless otherwise noted, each of the components of any one of these pairs are identical to the other of the pair. Each of the components in such a pair is, for descriptive purposes, referred to by a reference numeral common with that of the other component of the pair, one component's reference numeral being followed by an "a" and the other being followed by a "b". When referring to either of the paired components, the "a" or "b" is simply omitted.

Referring to FIG. 1, there is shown a standard ten-speed bicycle 1 mounted to which is the preferred embodiment of the present invention. Bicycle 1 is standardly equipped with pedal sprocket wheels 3 and 19 and cluster of axle sprocket wheels 69 through 73 (progressively smaller in size). As shown in FIG. 1, the input chain 16 mechanically couples pedal sprocket wheel 3 to input sprocket wheel 20 of the apparatus. The output sprocket wheel 22 is coupled to the bicycle's axle sprocket wheel 71 by means of output chain 18. Torque is transmitted from pedal sprocket wheel 3 to input sprocket wheel 20. By a means described below, torque is transmitted further to the output sprocket wheel 22 and thence to the axle sprocket wheel 71. Chains 16, 18 and 50 (50 shown in FIG. 2) and sprocket wheels 3, 19 through 22 and 69 through 73 are similar to the type found on conventional bicycles. The apparatus is housed with an enclosure 28 which comprises planar sides 28e and 28d bolted to annular portion 28c by means of bolts 36, as shown in FIG. 3. Referring further to FIG. 1, enclosure 28 has channel portions 35 and 38. Channel portions 35 and 38 are tubular members, positioned in sleeve-like fashion coaxially with and slidably engaged around bicycle frame member 2 and auxiliary tubular member 37, respectively. Auxiliary tubular member 37 is of a telescoping construction so that it may be bolted to bicycles of varying sizes.

Except due to gravity and chain 16, enclosure 28 is thus able to slide along members 2 and 37 in a generally upward direction. Detent 5 is slidably engaged around the bicycle frame member 4. Referring to FIG. 2, detent 5 has set screw 7 for securing detent 5 at any certain position along member 4 and for enabling adjustment of such position. Detent 5 also has wedge-like protrusion 6 against which enclosure 28 bears. Due to wedge-like protrusion 6, the specific position of detent 5 along member 4 effects the elevation of enclosure 28 resting against protrusion 6. As detent 5 is moved generally upwardly along member 4, enclosure 28, more particularly, is correspondingly forced upwardly and the detention of chain 16 is increased. When the position of enclosure 28 is tightened in this manner, enclosure 28 is fixed relative to bicycle frame member 2 by the opposite influences of detent 5 and chain 16. When detent 5 is moved generally downwardly along member 4, the position of enclosure 28 is loosened and chain 16 may be manually shifted from around sprocket wheels 3 and 20 to around pedal sprocket wheel 19 and alternative input sprocket wheel 21.

Also shown in FIG. 1 is spring-loaded, free wheeling idler 40 having miniature sprocket wheels with cogs that mesh with output chain 18. Idler 40 is pivotally connected to channel portion 35 and operates to take up slack in chain 18. Chain 18, therefore, may be manually shifted from any of axle sprocket wheels 69 through 73 to any other of axle sprocket wheels 69 through 73 without encountering excessive slack in chain 18 despite the differing sizes of sprocket wheels 69 through 73. When either of chains 16 and 18 are manually shifted from one sprocket wheel to another as discussed herein, the sequence of torque transmission remains unchanged—from a pedal sprocket wheel, to an input sprocket wheel, to output sprocket wheel 22, and then to an axle sprocket wheel—only the gear ratio is modified.

Referring to FIG. 3, a side cross-section of the apparatus is shown. Input sprocket wheels 20 and 21 and output sprocket wheel 22 are each mounted on a sprocket wheel holder 17 which is mounted within side 28e of enclosure 28. Bearings 61a and 61b enable free rotation of sprocket wheel holders 17a and 17b within side 28e.

Conical spools 52a and 52b are rotatably mounted on needle roller bearings 59a and 59b. Needle roller bearings 59a and 59b are mounted on axle cylinders 78a and 78b which are described in greater detail below. Mounted within sprocket wheel holders 17a and 17b are needle roller bearings 58a and 58b, respectively. Conical spools 52a and 52b are also rotatably mounted on needle roller bearings 58a and 58b. The rotation of conical spools 52a and 52b is directly coupled to the rotation of sprocket wheels 20a and 20b by means of guide rods 74 which insert through guide rod holes 75 in both the sprocket wheels and the conical spools. Guide rods 74 also insert through holes 75 of chain guides 62a and 62b, and the rotation of conical spools 52a and 52b is thereby also coupled to the rotation of chain guides 62a and 62b.

Figure 7:
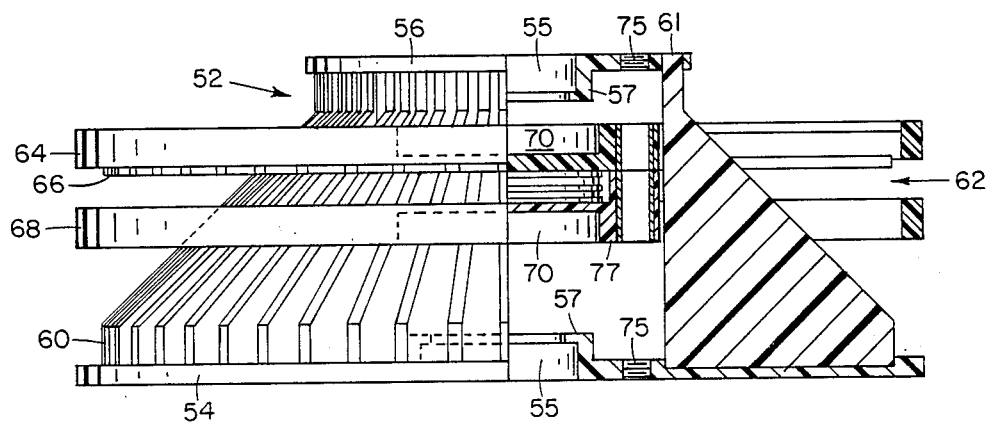
FIG. 7 is a detailed view, partially in cross-section, of one of conical spools 52, viewed in planes parallel to the plane of FIG. 3.

A detailed view of one of conical spools 52 is shown in FIG. 7. Conical spool 52 comprises a base plate 54 and a smaller diameter taper plate 56. Each plate has four guide rod holes 75 and a bearing hole 55. Protruding from the surface of base plate 54 are a plurality of cams 60 are planar members that each have an approximately triangular shape. The distal end of each cam 60 is a small rectangular portion which inserts into a corresponding cam slot 61 of taper plate 56. Each cam 60 is slip fit into the corresponding cam slot 61. Each plate 54 and 56 of carriage spool 52 has a bearing hole 55 into which fits either needle roller bearing 58 or 59 (as shown in FIG. 7). Each bearing hole 55 has a shoulder portion 57 to prevent the two plates from pulling apart.

Figure 6:
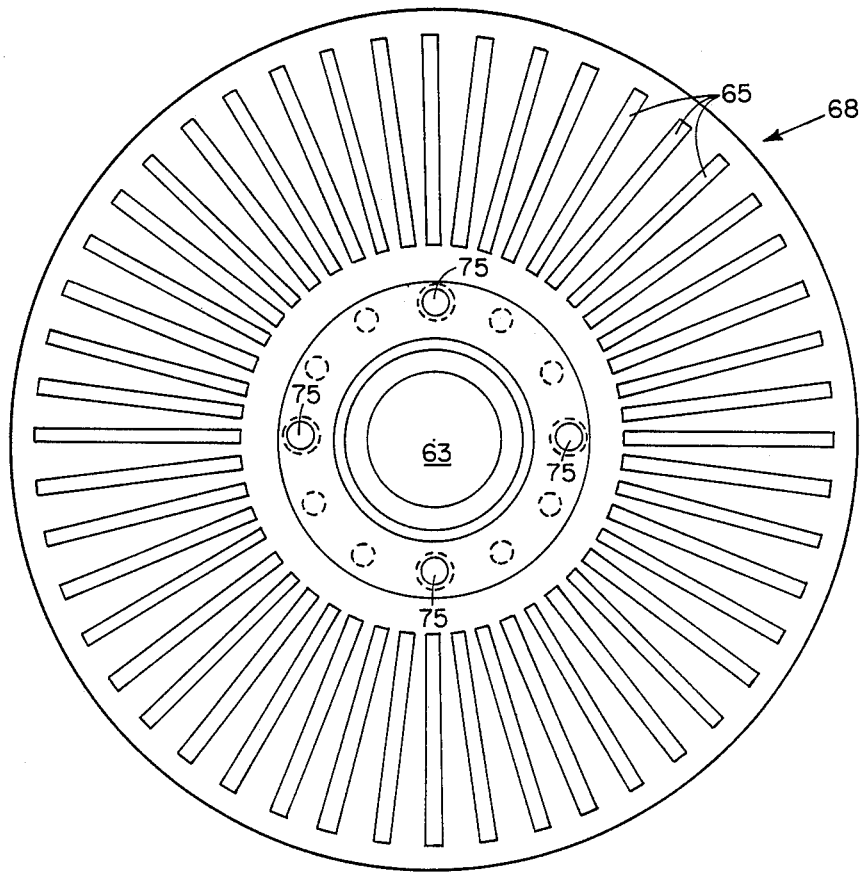
FIG. 6 is a detailed view of one of sheaves 68 of chain guide 62, viewed in a plane parallel to the plane of FIG. 1.

Each chain guide 62 comprises two sheaves, a taper plate sheave 64 and a base plate sheave 68. A detailed view of one of sheaves 68 is shown in FIG. 6. Each sheave has four guide rod holes 75 and a center hole 63. Guide rods 74 (shown in FIG. 3) insert through connecting portion 77 which rigidly connects the taper plate disk 64 to the base plate sheave 68. A plurality of cam passage channels 65 on each sheave allows the insertion of cams 60 when chain guide 62 is mounted on conical spool 52. Chain guide 62 can thus translate in directions perpendicular to the plane of FIG. 6 relative to conical spool 52. Referring again to FIG. 7, each sheave has a recess 76 which can receive shoulder portion 59 of bearing hole 55 in conical spool 52. Taper plate sheave 64, unlike base plate sheave 68, also has runners 66 which are raised longitudinal ridges that run between the cam passage channels 65. Between the sheaves of each chain guide 62 is slot ring cable chain 42. Slot ring cable chain 42 is always wedged between runners 66 of taper plate sheave 64 and cams 60 of conical spool 52. As will be explained below, this configuration provides positive mechanical coupling between slot ring cable chain 42 and the conical spool combined with the respective chain guide assembly. Due to such coupling, as input conical spool 52a and sheave 62a are made to rotate, slot ring cable chain 42 transmits torque to output conical spool 52b and sheave 62b.

Referring still to FIG. 3, there is shown a detailed view of one of the two axle assemblies 83. Axle assembly 83a forms an axle assembly on which conical spool 52a rotates, and axle assembly 83b forms an axle on which conical spool 52b rotates. They are in all respects identical. Each axle assembly 83 comprises an axle cylinder 78 and an axle cylinder 79 joined together by three slide rods 82. Each of axle cylinders 78 and 79 has three slide rod cavities 84 into which the slide rods 82 press fit. Impeller shaft 48 inserts into passageway 86 of axle cylinder 78 and passageway 87 of axle cylinder 79. Passageways 86 and 87, thus, form cylindrical bearing surfaces through which impeller shaft 48 rotates. The ends of each of axle cylinders 78a and 78b are threaded and screw into correspondingly threaded axle cylinder holes (not numbered) of enclosure side 28d. Impeller shaft 48 is positioned through passageway 86 of axle cylinder 78 and inserts into the hub 45 of impeller sprocket wheel 46. Impeller shaft 48 is secured and prevented from rotating relative to impeller sprocket wheel 46 by set screw 47. Thus, when impeller sprocket wheel 46 is rotated, impeller shaft 48 also rotates.

Referring still to FIG. 3, there is shown impeller disk 94. Impeller disk 94 is mounted on slide rods 82 and impeller shaft 48 through slide rod holes 96 and impeller shaft hole 98. Impeller shaft hole 98 threadably engages impeller shaft 48 while slide rods 82 are sized so as to easily slide through slide rod holes 96. In the assembled position, impeller disk 94 fits between taper plate sheave 64 and base plate sheave 68 of chain guide 62. Between each sheave and the impeller disk is a thrust bearing 110 and a thrust washer 112. Thrust bearing 110 enables the free rotation of chain guide 62 with respect to impeller disk 94. When impeller shaft 48 is rotated in correspondence with the rotation of impeller sprocket wheel 46, the threads of impeller shaft 48 force impeller disk 94 to move laterally in one direction or the other since disk 94 is prevented from rotating with impeller shaft 48 by slide rods 82. This forces chain guide 62 to move laterally along the length of impeller shaft 48 while chain guide 62 is also able to freely rotate with conical spool 52 about needle roller bearings 58 and 59. As chain guide 62 is moved laterally, the path of slot ring cable chain 42 is correspondingly modified.

FIG. 2 shows a view of the apparatus looking at the side 28d of enclosure 28. Impeller sprocket wheels 46a and 46b are shown as mechanically coupled to control sprocket wheel 44 by means of impeller chain 50 which is routed around idlers 49. Thus, rotation of control sprocket wheel 44 causes impeller sprocket wheels 46a and 46b to rotate in the same direction and to the same degree. This, in turn, causes chain guides 62a and 62b to move laterally and in tandem along cams 60a and 60b, respectively.

Figure 4:
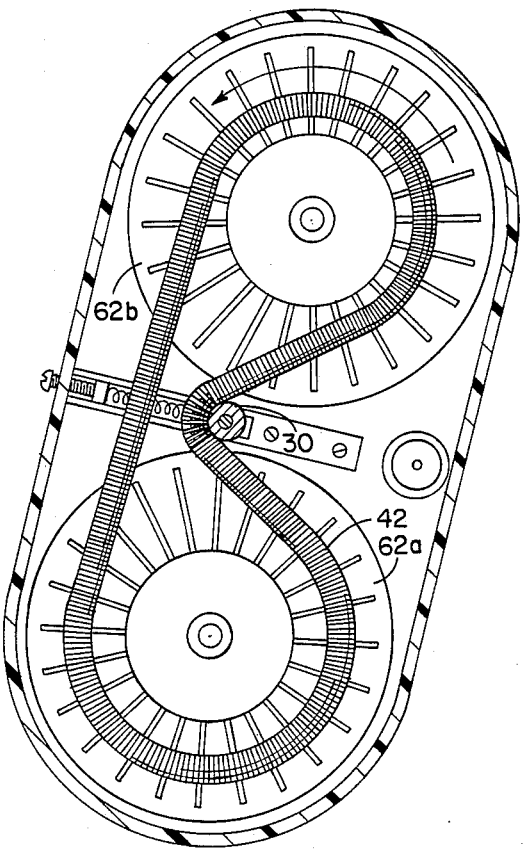
FIG. 4 is another cross-sectional view of the preferred embodiment in plane 4—4 as indicated in FIG. 3.
Figure 5:
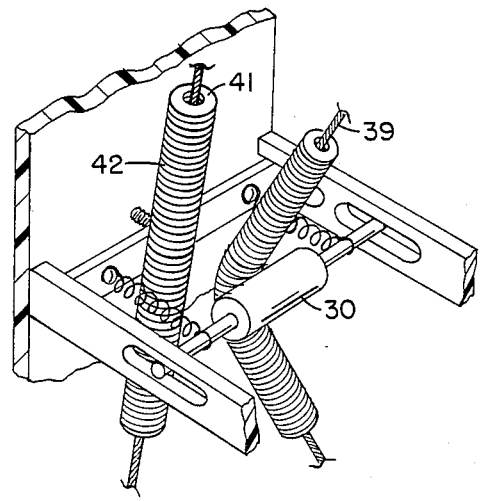
FIG. 5 is a close-up perspective view of spring-biased idler 30.

Referring to FIG. 4, a cross-section of the apparatus shows slot ring cable chain 42 coupling the rotation of spools 52a and 52b. Spring-biased sliding idler 30, a detailed view of which is shown in FIG. 5, maintains an appropriate amount of tension in slot ring cable chain 42. FIG. 8 is a closer view of slot ring cable chain 42 which is designed to engage both cams 60 of conical spool 52 and runners 66 of taper plate sheave 64. Slot ring cable chain 42 comprises a cable 39 and a plurality of rings 41 threaded around cable 39. The aperture of each ring is larger than the diameter of cable 39 enabling the rings to be displaced radially relative to cable 39. The rings may be metal washers or washers of other suitable wear resistant material.

As shown in FIG. 8, when tension is exerted upon cable 39, rings 41 roll down cams 60 toward the vertex formed by taper plate sheave 64 and cams 60. Due to such tension in cable 39 and due to the difference in the size of the aperture and the cable diameter, some of rings 41 insert into slots 65 of taper plate sheave 64, and others of washers 41 are displaced by runners 66 outwardly. Such insertion into slots 65 and displacement by runners 66 creates slots in slot ring cable chain 42 perpendicular to its length. Rotational force can be exerted upon cams 60 and upon taper plate sheave 64 of spool 52 by the rings on either side of the slots formed in slot ring cable chain 42 and torque can thus be transmitted. The slope of cams 60 assist in causing the displacement of rings 41 into slots 65. The rings inserted into slots 65, furthermore, are also able to exert force on the spool by pressing against taper plate sheave 65. At the same time, runners 66 displace rings 41 which forms a slot within slot ring cable chain 42 such that rings on either side of a runner 66 can exert force upon taper plate sheave 65 also. This arrangement provides positive mechanical engagement between slot ring cable chain 42 and conical spool 52, not dependent upon friction, while minimally interfering with the sliding of chain guide 62 and slot ring cable chain 42 along the lengths of cams 60.

Because rings 41 are free to rotate about cable 39, the travel of slot ring cable chain 42 along the edges of cams 60, such travel being dictated by traversal of chain guide 62, is virtually frictionless. At the same time, however, the previously described slots formed within slot ring cable chain 42 automatically adjust in size and relative spacing in order to continue mechanical coupling with conical spools 52, despite the corresponding variation in pitch of conical spools 52a and 52. Thus, the pitch of slot ring cable chain 42, itself, is infinitely variable, conforming the the infinitely variable pitch of spools 52. Furthermore, spring-biased idler 30 displaces slot ring cable chain 42 inwardly so as to increase the area of contact around each chain guide 62 from 180° to about 1240°. This further decreases any chance of slippage while minimizing the force exerted on each cam 60.

Referring again to FIG. 3, conical spools 52a and 52b have parallel axes but are oriented oppositely relative to each other. By moving chain guides 62a and 62b laterally and in tandem (as previously discussed) between their limits of travel, the gear ratio between input sprocket wheel 20 and output sprocket wheel 22 is varied continuously owing to the differences in effective diameters of spools 52a and 52b as chain guides 62a and 62b traverse cams 60a and 60b. An infinite variety of gear ratios is, therefore, achievable and conical spools 52a and 52b, thus enable achievement of infinitely variable gear ratios.

In this preferred embodiment, a battery operated direct current motor 14 (FIG. 3) is coupled to control sprocket wheel 44. Referring again to FIG. 1, a bidirectional switch mounted on a handlebar enables motor 14 to rotate in either direction. By operating switch 9, a user may cause the gear ratio between the conical spools 52a and 52b to change from one extreme to the other of the infinite variety of gear ratios therebetween.

Furthermore, when mounted on a ten-speed bicycle as in FIG. 1, the present invention is manually programmable to even further increase its versatility. In addition to the infinite variety of gear ratios achievable due to conical spools 52a and 52b, the range of such infinite variety is shifted to other ranges by manually shifting chains 16 and 18. As previously discussed, chain 18 is manually shiftable from any of axle sprocket wheels 69 through 73 to any other of axle sprocket wheels 69 through 73. Chain 16 is manually shiftable from pedal sprocket wheel 3 and input sprocket wheel 20 to pedal sprocket wheel 19 and alternative input sprocket wheel 21, as well, and vice versa. Thus, the versatility of the infinitely variable gear ratios achievable by conical spools 52a and 52b is compounded many fold by manually shifting chains 16 and 18 in the overall embodiment of the present invention as shown in FIG. 1. That overall embodiment consequently, is manually transformable over a broad range of application from a bicycle for high speed racing to one for mounting climbing.

Although the invention has been described in conjunction with the foregoing specific embodiment, many alternatives, variations and modifications are apparent to those of ordinary skill in the art. Those alternatives, variations and modifications are intended to fall within the spirit and scope of the appended claims.

I claim:

1. A torque transmission apparatus having an infinitely variable gear ratio, comprising:
   an input shaft;
   an output shaft;
   an input sprocket wheel rotatably mounted on said input shaft;
   an output sprocket wheel rotatably mounted on said output shaft;
   an input spool rotatably mounted on said input shaft;
   a plurality of planar segments rigidly connected to said input spool in a radial orientation such that the outer edges of said planar segments collectively approximate a conical shape;
   an output spool rotatably mounted on said output shaft;
   a plurality of planar segments rigidly connected to said output spool in a radial orientation such that the outer edges of said planar segments collectively form a generally conical shape;
   an input chain guide and an output chain guide each comprising two sheaves with each sheave having a plurality of radially oriented slots, said chain guides being mounted on said input and output spools, respectively, such that each of said planar segments are slidably inserted through a corresponding slot of said chain guides;
   means for mounting said shafts and spools such that the cones approximated by the outer edges of the planar segments of each spool are oppositely oriented;
   a flexible means coupling the rotation of said output chain guide and spool to the rotation of said input chain guide and spool by engaging the outer edges of the planar segments of each spool;
   means for coupling the rotation of said input sprocket wheel to said input spool;
   means for coupling the rotation of said output sprocket wheel to said output spool;
   means for maintaining the positions of each of said chain guides along the length of the spool on which said chain guide is mounted; and
   means for adjusting the position of each of said chain guides along the length of the spool on which said chain guide is mounted.

2. The apparatus of Claim 1 wherein each of said means for maintaining and adjusting the position of said chain guide comprises:
   a threaded shaft rotatably and colinearly mounted within each of said shafts;
   an impeller disk threadably mounted on said threaded shaft and rotatably mounted between the sheaves of said chain guide; and
   means for preventing said impeller disk from rotating such that rotation of said threaded shaft linearly translates said chain guide along the length of said spool.

3. The apparatus of claim 2 wherein each of said threaded shafts is rigidly connected to an impeller sprocket wheel and further comprising means for mechanically coupling the rotation of each impeller sprocket wheel to the other.

4. The apparatus of claim 3 wherein said means for preventing said impeller disk from rotating comprises a plurality of slide rods inserted through corresponding eccentrically located holes in said impeller disk and wherein said slide rods are mounted within said shafts.

5. The apparatus of claim 1 wherein said flexible means comprises a cable and plurality of rings threaded around said cable, which rings have aperture diameters enabling the displacement of said rings into said radially oriented slots of said chain guides by said radially oriented planar segments such that said flexible means positively engages each of said spools.

6. The apparatus of claim 5 wherein one of the sheaves of each of said chain guides has radially oriented ridges for further displaying said rings from said cable such that said flexible means positively engages each of said chain guides.

7. A torque transmission apparatus, comprising:
an input spool and an output spool with each spool having radially projecting planar segments the outer edges of which collectively form a conical shape;
means for rotatably mounting the input and output spools adjacent one another such that the cones formed by the outer edges of the planar segments of each spool are oppositely oriented;
a flexible chain for engaging the outer edges of each spool and thereby coupling the rotation of the output spool to the input spool; and
an input chain guide and an output chain guide mounted on the input and output spools, respectively, with each guide comprising a pair of sheaves with radially oriented slots through which pass the planar segments of the respective spools thereby defining a circumferential track for the flexible chain around each spool.

8. The apparatus as set forth in claim 7 further comprising means for effecting traversal of the chain guides along their respective spools in tandem with one another.

9. The apparatus as set forth in claim 8 wherein the chain guide traversal effecting means comprises an impeller disk mounted between each sheave of each chain guide and through which is threaded an impeller shaft such that rotation of the impeller shaft causes translation of the impeller disk along the impeller shaft and further wherein the rotation the impeller shafts are mechanically coupled to enable simultaneous translation of each chain guide.

10. The apparatus of claim 7 wherein the flexible chain comprises a cable and a plurality of rings threaded around the cable, which rings have aperture diameters enabling the displacement of the rings into the radially oriented slots of the chain guides by the radially oriented planar segments such that the flexible chain positively engages each of the spools.

11. The apparatus of claim 10 wherein one of the sheaves of each of the chain guides has radially oriented ridges for further displacing the rings from the cable such that the flexible chain positively engages each of the chain guides.

* * * * *